United States Patent [19]

Peterson et al.

[11] Patent Number: 4,520,876
[45] Date of Patent: Jun. 4, 1985

[54] GAUGE AND GUIDE WHEEL ASSEMBLY

[75] Inventors: Richard L. Peterson, Le Sueur; Roger J. Scheurer, Kasota; Richard W. Steinberg, North Mankato, all of Minn.

[73] Assignee: Hiniker Company, Mankato, Minn.

[21] Appl. No.: 526,681

[22] Filed: Aug. 26, 1983

[51] Int. Cl.³ ............................................. A01B 63/16
[52] U.S. Cl. ................................ 172/427; 280/80 R; 280/43.2; 172/538; 172/26
[58] Field of Search ...................... 172/23, 26, 78, 427, 172/423, 395, 176, 701, 310, 240, 243, 419; 180/131; 280/43.2, 80 R, 80 A, 776, 81 R, 81 A, 81 B; 104/244.1

[56] References Cited

U.S. PATENT DOCUMENTS

| | | | |
|---|---|---|---|
| 601,342 | 3/1898 | Hunt | 172/538 X |
| 693,474 | 2/1902 | Weston | 172/383 |
| 757,999 | 4/1904 | Davis | 172/538 |
| 1,318,536 | 10/1919 | Brown | 172/538 |
| 2,685,243 | 8/1954 | Cole | 172/536 |
| 2,918,300 | 12/1959 | Hendrickson | 280/80 R |
| 3,252,522 | 5/1966 | Taylor | 172/414 |
| 3,559,747 | 2/1971 | Cline | 172/727 |
| 3,760,885 | 9/1973 | McKenzie | 172/176 |
| 4,009,668 | 3/1977 | Brass et al. | 111/85 |
| 4,282,934 | 8/1981 | Bezzerides | 172/26 |
| 4,404,918 | 9/1983 | Whalen | 172/538 |

OTHER PUBLICATIONS

Brochure-*Buffalo All-Flex Till Planter*-Fleischer Manufacturing Inc., Columbus, Nebraska.

*Primary Examiner*—Richard J. Johnson
*Attorney, Agent, or Firm*—Burd, Bartz & Gutenkauf

[57] ABSTRACT

A guide and gauge wheel assembly for a tool bar row crop planter has an arm mounted on the tool bar and pair of wheels rotatably mounted on non-linear axles. The axles are selectively mounted on lateral sleeves and upwardly and outwardly inclined sleeves secured to the arm to position the wheels in a toe-out and camber position, or a side-by-side parallel position.

19 Claims, 9 Drawing Figures

GAUGE AND GUIDE WHEEL ASSEMBLY

FIELD OF INVENTION

The invention relates to earthworking implements having wheel assemblies for supporting and guiding the implements over the ground. More particularly, the invention is directed to a gauge and guide wheel assembly for use with a row crop seed planter.

BACKGROUND OF INVENTION

Ridge planting of row crops has been developed to conserve soil and energy. Row crop seed planters are used to plant seeds, such as corn, beans, and sorghum, in the crest of longitudinal ridges in the seed bed. The ridges can be elongated rows that are maintained in the seed bed year after year. The trash and residue from the crop falls off the ridges and is collected between the rows. The ridges remain high and clear of trash thereby allowing the use of a row crop seed planter, such as the planter shown by Brass et al., in U.S. Pat. No. 4,009,668, to plant seeds along the crest of the ridges. These planters have transverse tool bars that are connected to the tractor with a hitch. The planter must be guided along the field with the tractor to maintain the seed planting units on the crest of the ridges. This requires constant and tedious attention of the operator of the tractor and is difficult to achieve. The guide and gauge wheel assembly of the present invention facilitates the proper alignment of the planting units with the crest of the ridges in the field when used in a ridge tillage agricultural practice.

Ridge tillage practices are not universally used in row crop agriculture. Row crop planters are used in the conventional tillage to plant the seeds. These planters utilize gauge wheels to maintain the proper position of the planter tool bar. The gauge and guide wheel assembly of the invention can be readily converted into side-by-side gauge wheels for conventional tillage planting.

SUMMARY OF INVENTION

The invention is directed to a wheel assembly for use with an implement having a transverse tool bar for providing guide and/or gauge functions for the implement. The wheel assembly has an arm adapted to be mounted on the tool bar. A pair of wheel and axle means support the arm and tool bar above the ground. Each wheel and axle means has a ground engaging wheel and a non-linear axle rotatably supporting a wheel. The axle has a first section and a second section. The second section is extended at an obtuse angle relative to the longitudinal axis of the first section. The wheel is rotatably mounted on the first section of each axle. A pair of mount structures secured to the arm are adapted to selectively accommodate the axles and thereby mount the wheel and axle means on the arm. The mount structure has a first means for accommodating the second section of each axle to hold the wheels in a toe-out and camber position. The mount structure further includes a second means secured to the arm to accommodate the axles to hold the wheels in upright spaced side-by-side positions.

When the wheel assembly is used with a row crop planter, the wheel and axle means are utilized with the first means to locate the wheels in toe-out and camber positions. The toe-out and camber angles of the wheels guide the planter units along the crest or top of the ridges in the soil. This permits the operator to drive the tractor without constant observation and guidance of the planter. The wheel and axle means are mounted on the second means to locate the wheels in a side-by-side position when a conventional tillage planting practice is utilized with a row crop planter.

In a specific embodiment of the gauge and guide wheel assembly of the invention, the wheel assembly has a single arm with an upper end pivotally attached to a pair of plates mounted on the tool bar. A selectively extendible and contractible means is secured to the arm to hold the arm in a selected position relative to the tool bar. This position can be adjusted by operation of the extendible and contractible means, thereby changing the elevation of the tool bar. A pair of wheel and axle means support the arm and tool bar above the ground. Each wheel and axle means has a ground engaging wheel and a non-linear axle rotatably supporting a wheel. The axle has a first section and a second section. The second section is extended at an obtuse angle relative to the longitudinal axis of the first section. The wheel is rotatably mounted on the first section with a hub having conventional bearings. A pair of first sleeves are secured to the lower end section of the arm. The first sleeves extend in opposite lateral directions and have a common transverse axis. The second section of each axle is mounted on the first sleeves to hold the wheels in a desired toe-out and camber position. A pair of second sleeves are mounted on the arm adjacent the first sleeves. The second sleeves extend laterally and upwardly from opposite sides of the arm and position the first sections of the axle along the common lateral axis. This locates the wheels in spaced side-by-side positions allowing the planter to be used with conventional seed bed tillage practice. The wheel assembly can be converted to locate the wheels in the toe-out and camber position and the side-by-side position with a minimum of time and effort. Additional parts are not required to change or adjust the wheel assembly.

IN THE DRAWING

DESCRIPTION OF PREFERRED EMBODIMENT

Figure 1:
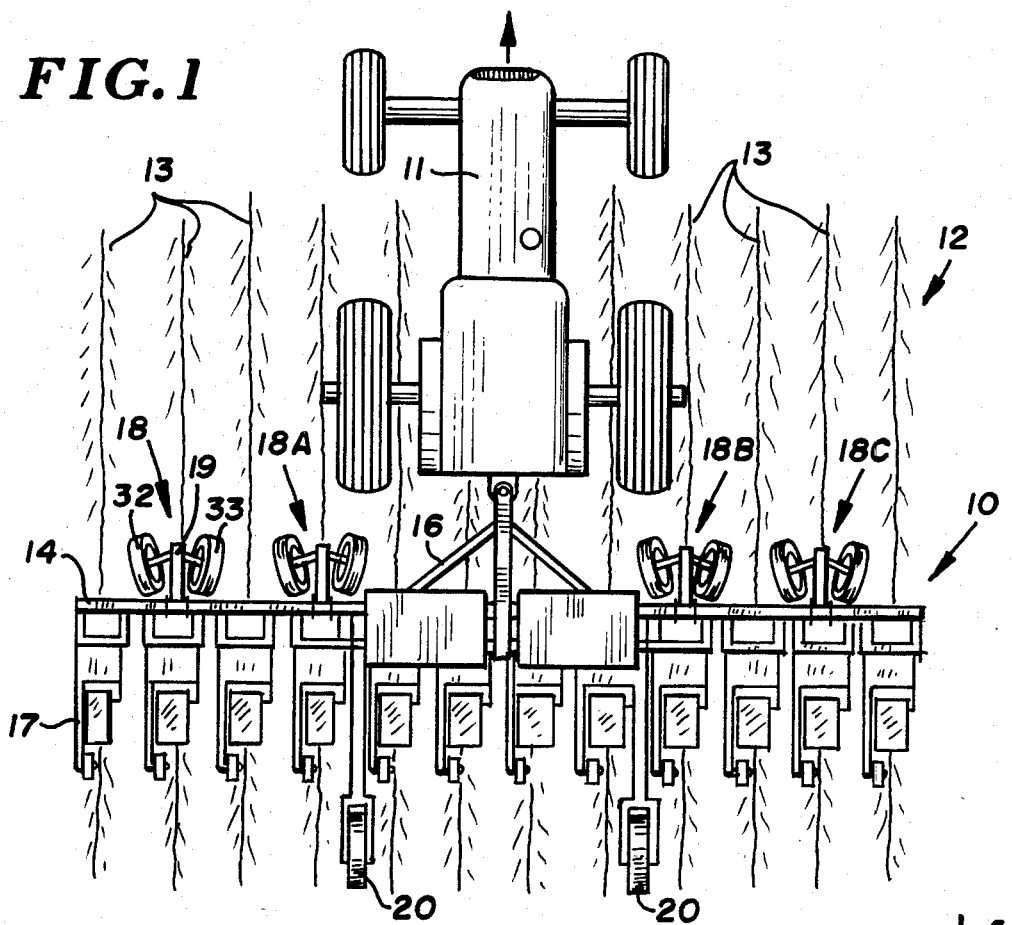
FIG. 1 is a plan view of a row crop agricultural implement with a plurality of wheel assemblies of the invention.

Referring to FIG. 1, there is shown an agricultural earthworking and row crop planting implement, known as a row crop planter, indicated generally at 10 coupled to a tractor 11 for towing the planter over an agricultural field 12. Field 12 has a plurality of elongated parallel ridges 13. Planter 10 is used in both conventional and ridge tillage soil management and crop practices. In the ridge tillage system, planter 10 operates to work the soil along the ridges and plant seeds, such as corn, beans, and sorghum, along the crests of the ridges.

Planter 10 has a transverse tool bar 14 connected to tractor 11 with a hitch 16. A plurality of seed planting units 17 are attached to tool bar 14. Planting units 17 are row crop planters that work the soil and dispense seed into the soil. Examples of row crop planters are shown by Cole in U.S. Pat. No. 2,685,234 and Brass, et al. in U.S. Pat. No. 4,009,668. Units 17 are maintained in alignment with ridge 13 with a plurality of dual gauge and guide wheel assemblies 18, 18A, 18B, and 18C. Wheel assemblies 18-18C cooperate with a pair of trailing wheel assemblies 20 to level and maintain a selected elevation of tool bar 14.

Figure 2:
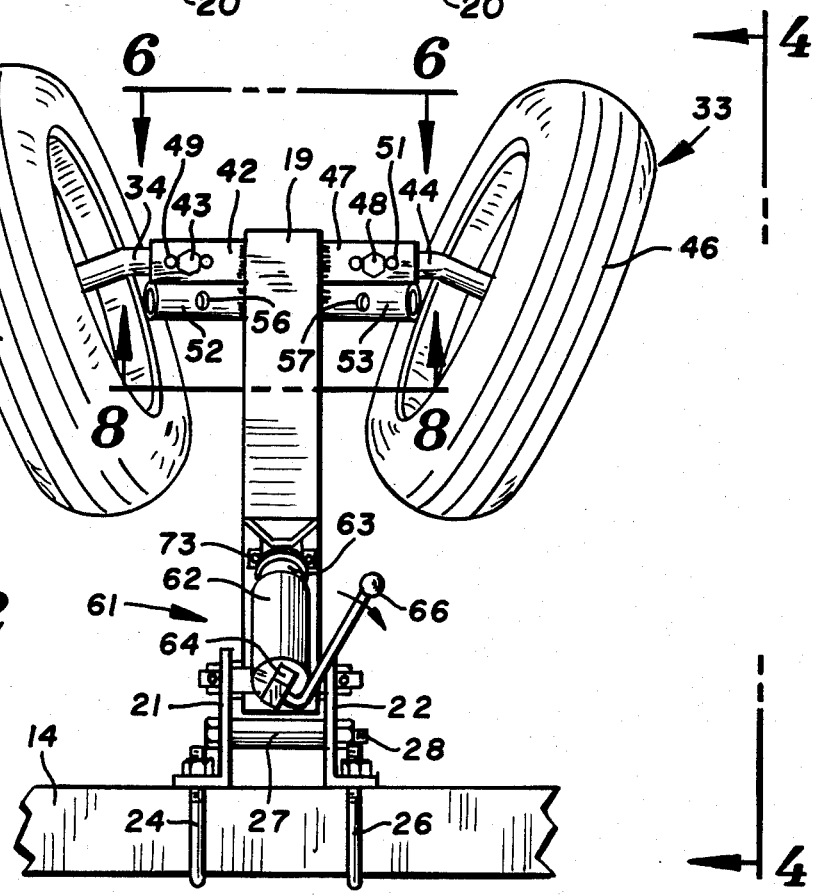
FIG. 2 is an enlarged plan view of a wheel assembly mounted on the tool bar of the implement.
Figure 3:
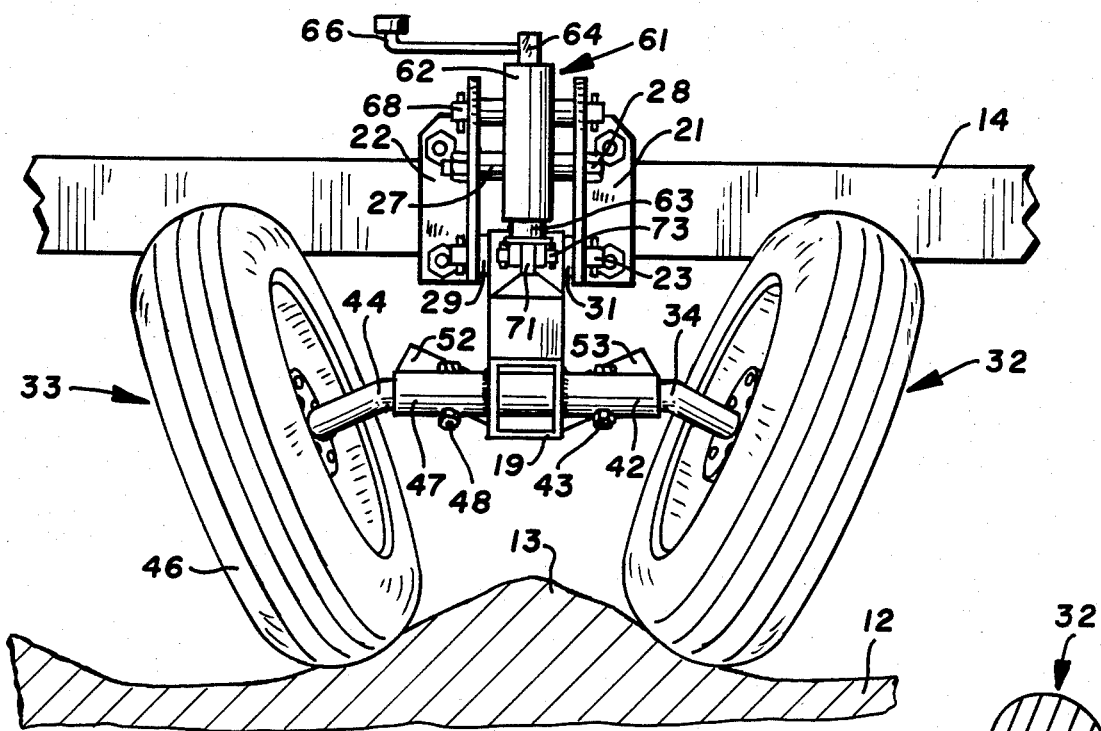
FIG. 3 is a front elevational view of FIG. 2.
Figure 4:
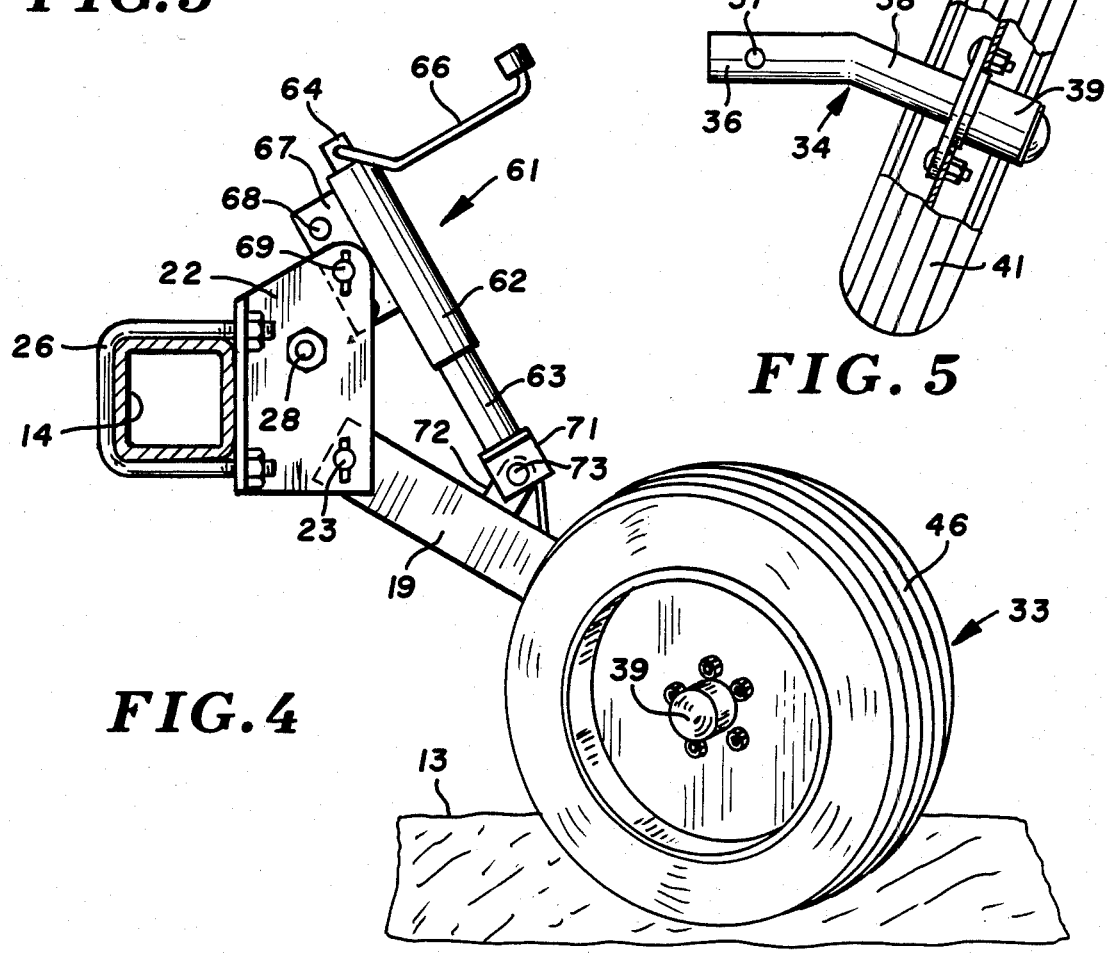
FIG. 4 is a side elevational view taken along the line 4—4 of FIG. 2.

The dual gauge and guide wheel assemblies 18-18C are identical in structure and function. The following description is directed to wheel 18 attached to tool bar 14. As shown in FIGS. 2, 3, and 4, wheel assembly 18 has a single longitudinally extended arm or spindle tube 19. A pair of plates 21 and 22 form a mount to connect arm 19 to tool bar 14. The upper end section of arm 19 is pivoted with a pivot pin 23 to plates 21 and 22. A pair of U-bolts 24 and 26 secure plates 21 and 22 to tool bar 14. Plates 21 and 22 are held in a fixed lateral position by a tubular spacer 27 and a nut and bolt assembly 28. As shown in FIG. 3, spacer washers 29 and 31 are located about pivot pin 23 on opposite sides of arm 18 to center arm 18 between plates 21 and 22. Arm 19 pivots about the axis of pin 23 so that the elevation of tool bar 14 can be adjusted.

Figure 5:
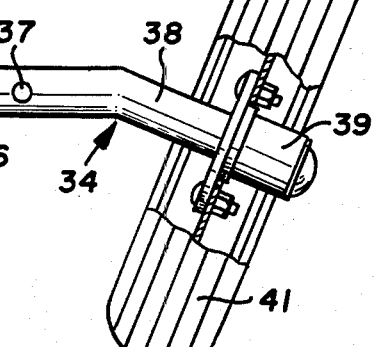
FIG. 5 is an elevational view, partly sectioned, of a wheel and axle of the wheel assembly.

A pair of wheel and axle assemblies indicated generally at 32 and 33 are mounted on the forward or lower end section of arm 19. Referring to FIG. 5, wheel and axle assembly 32 has a non-linear axle or spindle 34 rotatably supporting a wheel 41 via a conventional hub and bearings 39. Wheel 41 includes a conventional pneumatic tire. Axle 34 has a cylindrical inner portion or section 36 having a hole 37 and an outer portion or section 38 rotatably supporting hub 39 connected to wheel 41. Outer portion 38 is angularly disposed with respect to inner portion 36. Outer portion 38 extends at an obtuse angle relative to the longitudinal axis of inner portion 36. Preferably, outer portion 38 extends at an angle of between 15-30 degrees with respect to the longitudinal axis of inner portion 36. The angle between axle sections 36 and 38, shown in FIG. 5, is about 25 degrees. This angle can vary to change the tilt angle of wheel 41.

Figures 6, 7:
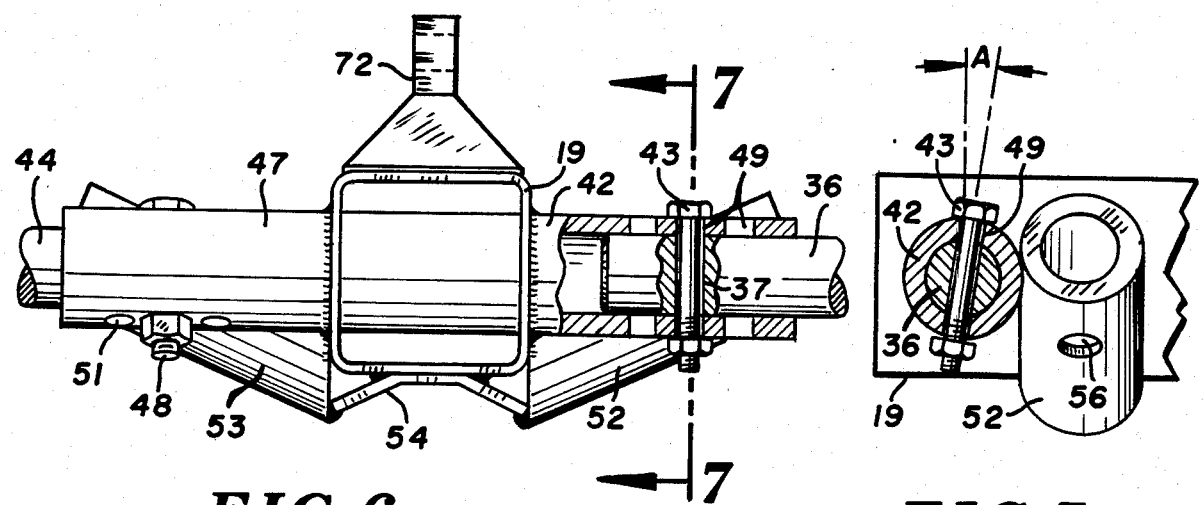
FIG. 6 is an enlarged fragmentary front view viewing along the line 6—6 of FIG. 2.
FIG. 7 is a sectional view taken along the line 7—7 of FIG. 6.

The wheel and axle assemblies 32 and 33 are mounted on first sleeves 42 and 47 secured to opposite sides of the lower section of arm 19. As shown in FIGS. 2, 3, and 6, inner portion 36 of axle 34 is mounted in sleeve 42 secured to the forward and lower end section of arm 19 with welds or the like. Sleeve 42 extends laterally and is located normal to the longitudinal axis of arm 19. Sleeve 48 has a cylindrical passage accommodating the cylindrical inner portion 36. As shown in FIGS. 2 and 6, sleeve 42 has a plurality of holes 49 for accommodating a retaining pin or nut and bolt assembly 43. Pin 43 extends through holes 49 and hole 37 in axle portion 36 and thereby prevents rotation of axle 34 and maintains the axle in assembled relation with sleeve 42. Holes 49 permit adjustment of the lateral location of the wheel 41 relative to arm 19. As shown in FIG. 7, pin 43 is located at an incline relative to the vertical at an angle A. Preferably, angle A is between 7-10 degrees. The angle can vary to adjust the diverging or toe-out angle and tilt or camber angle of heel 32.

Wheel and axle assembly 33 has an obtuse angled nonlinear axle 44 rotatably supporting a wheel 46. Wheel 46 includes a conventional pneumatic tire. Axle 44 is removably mounted in outwardly directed sleeve 47 secured to arm 19. Sleeve 47 is axially aligned with sleeve 42 and projects outwardly from the opposite side of arm 19. Sleeves 42 and 47 are a single linear tube that extends through aligned holes in the sides of arm 19. The sleeve passages have a common longitudinal axis that is transverse to the axis of arm 19. A nut and bolt assembly or pin 48 extended through hole 51 in sleeve 47 releasably retains axle 44 in assembled relation with sleeve 47. Pin 48 is positioned at an incline relative to the vertical at a relatively small angle, such as 7-10 degrees. This angle can vary to provide an adjustment of the diverging or toe-out angle and tilt or camber angle of wheel 33.

As shown in FIGS. 2 and 3, the toe-out angle and camber angle of wheels 32 and 33 are opposite identical angles with respect to the longitudinal axis of arm 19. The toe-out and camber angles of wheels 32 and 33 improve the stability of planter 10 and aid the planter shoe or furrow openers to stay in longitudinal alignment with the crests of the ridges in the soil. In some hitch arrangements, sway blocks are provided in hitch 16 to allow the entire planter 10 to freely move and follow the previous row ridges. The camber and toe-out angles of the wheels 32 and 33 guide the seed planting units along the ridges in the soil. This permits the operator to drive the tractor 11 without constant observation and guidance of planter 10.

Figure 8:
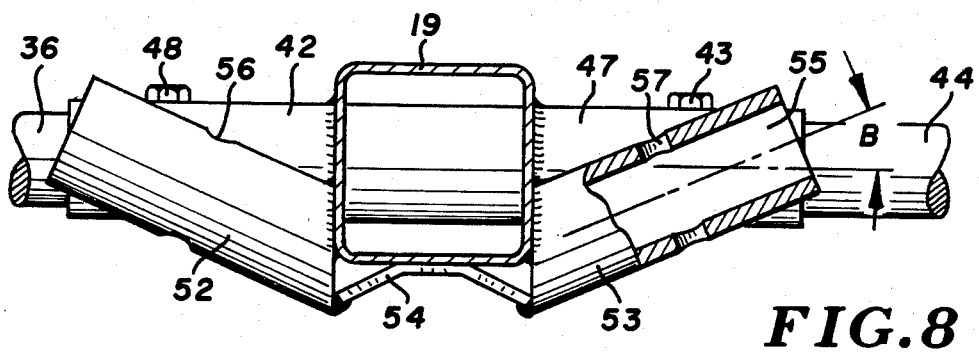
FIG. 8 is an enlarged sectional view taken along the line 8—8 of FIG. 2.
Figure 9:
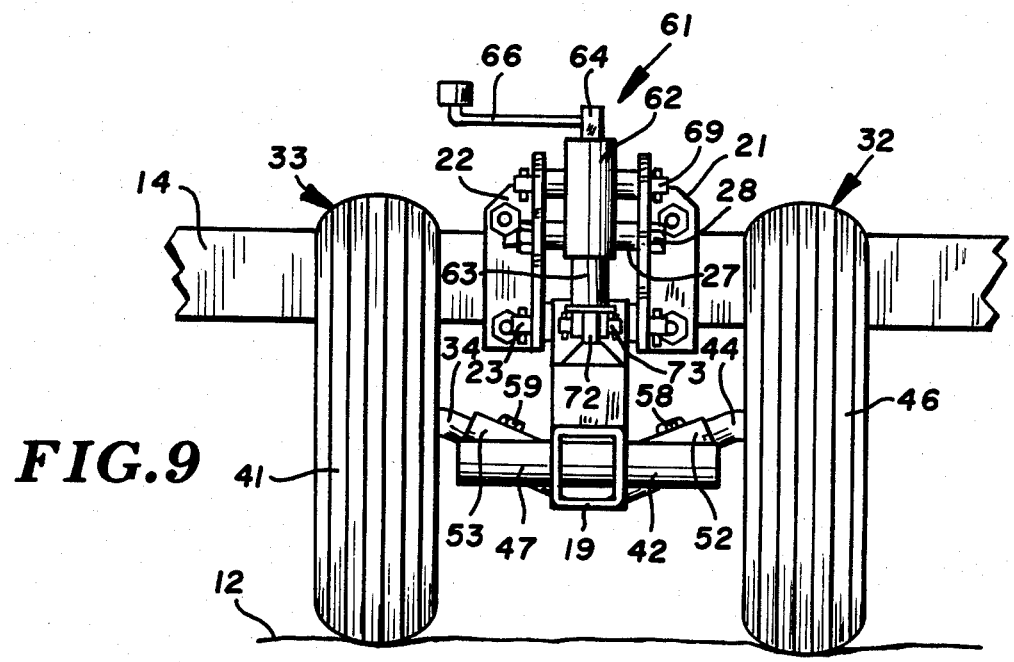
FIG. 9 is a front elevational view of the wheel and axle similar to FIG. 2 showing the wheels in vertical positions.

Referring to FIGS. 8 and 9, wheel and axle assembly 33 has a pair of second tubular members or sleeves 52 and 53 secured to opposite sides of the lower end section of arm 19. Sleeves 52 and 53 are secured to arm 19 adjacent first sleeves 42 and 47. As seen in FIG. 8, sleeves 52 and 53 extend upwardly and outwardly in opposite lateral directions from the opposite sides of arm 19. Sleeves 52 and 53 have an upwardly diverging relationship relative to the longitudinal axis of arm 19. Each sleeve 52 and 53 extends upwardly and outwardly at an angle of about 25 degrees with respect to a longitudinal plane passing through the longitudinal axis of arm 19. Other angles can be used, depending upon the obtuse angle of the axles 34 and 44. A transverse reinforcing bracket 54 extends between and is secured to adjacent inner ends of sleeve 53 and arm 19 to insure the integrity of the welded connection between the inner ends of sleeves 52 and 53 and arm 19.

As shown in FIG. 8, sleeve 53 has a cylindrical inclined passage 55 having a size and length to accommodate the cylindrical portion 36 of axle 34. When axle 34 is mounted on sleeve 53, as shown in FIG. 9, a releasable bolt or pin 59 extends through holes 57 in sleeve 53 and hole 37 in axle 36 to retain axle 34 in a fixed lateral and rotational assembled relation with sleeve 53. The first axle section 38 is held in a horizontal transverse position and wheel. Wheel 46 is located in a generally upright position. Wheel 46 rotates about a transverse horizontal axis.

Sleeve 52 has a cylindrical passage for accommodating the inner end of axle 44. A nut and bolt assembly or pin 58 holds axle 44 in fixed assembled relation with sleeve 52 and orients wheel 46 for rotation about a generally horizontal axis. Sleeves 52 and 53 are used to retain wheels 41 and 46 in parallel side-by-side relation so that they function as a pair of gauge wheels rotatable about a common horizontal axis. This axis of rotation of the wheels 41 and 46 is generally parallel to the longitudinal extent of tool bar 14.

The vertical adjustment of tool bar 14 is facilitated with an extendible and contractible assembly indicated generally at 61 in FIGS. 2, 3, 4, and 9. The extendible and contractible assembly 61 is a manually operated screw jack that is operable to adjust the angle of the arm 19 relative to the longitudinal axis of tool bar 14 and thereby adjust the elevation of tool bar 14. As shown in FIG. 4, extendible and contractible assembly 61 has a cylindrical body 62 linearly accommodating a tubular member 63. An elongated longitudinal screw 64 extended into body 63 is threaded into a nut (not shown) retained in the tubular member 63. A crank handle 66 is connected to the upper end of screw 64. The screw 64 is rotatably mounted with suitable bearings (not shown) in body 62. Handle 66 is rotated to selectively extend or shorten the linear length of the extendible and contractible assembly 61. This pivots arm 19 on pivot pin 23 and changes the height of tool bar 14 relative to the ground.

A flat flange 67 is secured to a side of body 62. Flange 67 has a plurality of holes 68 accommodating a pin 69. Pin 69 is mounted in the upper end of the side plates 21 and 22 and thereby pivotally mounts the extendible and contractible assembly 61 on plates 21 and 22. As shown in FIG. 4, pin 69 is located directly above the pivot pin 23 for the upper end section of arm 19.

The lower end of member 63 has a bifurcated or clevis structure 71 located adjacent opposite sides of an ear 72. Ear 72 is secured to the top of arm 19. A pivot pin 73 pivotally connects clevis 71 to ear 72. With wheels 41 and 46 in engagement with the ground 13, the extendible and contractible assembly 61 holds arm 19 in a selected angular position relative to tool bar 14. When crank handle 66 is rotated, the angle of arm 19 relative to tool bar 14 is changed, thereby changing the elevation of tool bar 14.

In use, as shown in FIG. 1, two pair of forward dual gauge and guide wheel assemblies 18, 18A, and 18B, 18C are utilized in association with tool bar 14 attached to twelve row crop planting units. The wheel assemblies are mounted on tool bar 14 in side-by-side spaced positions so that they each straddle a separate longitudinal ridge 13 in the soil. Ridges 13 can be the ridges from the previous year's crop, or ridges made in the soil with an earthworking implement having rotating discs. When the row crop planting implement 10 is used in ridge tillage practice, planting units 17 follow the tops or crests of the ridges. The wheel assemblies 18, 18A, and 18B, 18C are located in positions, as shown in FIG. 2. Axles 34 and 44 are mounted in the horizontal sleeves 42 and 47 and retained therein with the nut and bolt assemblies 43 and 48, respectively. The lateral distance between wheels 41 and 46 can be adjusted by selecting one of the laterally spaced holes 49 in the sleeves 42 and 47. The angled axles 34 and 44 locate wheels 41 and 46 at a selected toe-out angle and a camber or tilt angle. The wheels 41 and 46 tilt upwardly and outwardly, as shown in FIG. 2. The wheels 41 and 46, in their toe-out and camber angled positions, help the planter unit 17 to stay on the top or crests of the ridges 13.

The extendible and contractible assembly or screw jack 61 is manually operated to adjust the vertical position or elevation of tool bar 14. Each of wheel assemblies 18, 18A and 18B, 18C is individually adjusted. Handle 66 is rotated to provide the selective length of the extendible and contractible assembly 61.

The wheel assemblies 18, 18A and 18B, 18C are also useable in conventional tillage planting. In this type of planting, the wheels 41 and 46 run at straight or vertical positions about a common transverse horizontal axis. The positions of the wheels in a conventional tillage planting agricultural practice are shown in FIG. 9. The axles 34 and 44 are removed from the horizontal sleeves 47 and 42, respectively, and placed in the inclined sleeves 53 and 52, respectively. The nut and bolt assemblies 59 and 58 retain axles 34 and 44 in the spindles 53 and 52. This holds the wheels 41 and 46 in their vertical side-by-side or tandem positions, as shown in FIG. 9.

While there has been shown and described the preferred embodiment of the wheel and axle assembly of the invention, as used with a tool bar row crop planter, it is understood that changes in the structure and arrangement of structure of the wheel assembly and the use of the wheel and axle assembly with other types of implements may be made by those skilled in the art without departing from the invention. The invention is defined in the following claims.

The embodiment in which an exclusive property or privilege is claimed is defined as follows:

1. A wheel assembly for an implement having a transverse tool bar comprising: an arm, first means adapted to be connected to the tool bar, pivot means pivotally connecting the arm to the first means to allow pivotal movement of the arm about a generally horizontal axis, second means connected to the arm to hold the arm in a selected position relative to the tool bar, a pair of wheel and axle means for supporting the arm and tool bar above the ground, each wheel and axle means having a ground engaging wheel and axle rotatably supporting a wheel, each axle having a first section and a second section, said second section extended at an angle relative to the longitudinal axis of the first section, means rotatably mounting a wheel on the first section of each axle, first sleeve means mounted on the arm for selectively connecting the axles of the arm, said second section of each axle being mounted on the first sleeve means in a position to hold the wheels in a toe-out and camber position, and second sleeve means mounted on the arm, said second section of each axle being mounted on the second sleeve means in a position to hold the wheels in upright spaced side-by-side positions.

2. The assembly of claim 1 wherein: the first means includes plate means, and means for mounting the plate means on the tool bar, said pivot means comprising first pivot means pivotally connecting an upper end of the arm to the plate means, second pivot means pivotally connecting the second means to the plate means, and third pivot means pivotally connecting the second means to the arm.

3. The assembly of claim 2 wherein: the second means is a selectively linear extendible and contractible assembly operable to vary the selected position of the arm whereby the elevation of the tool bar can be controlled.

4. The assembly of claim 1 wherein: the first and second sleeve means have passages for accommodating the second sections of the axles.

5. The assembly of claim 1 wherein: the second section of each axle extends at an angle of between 15–30 degrees relative to the longitudinal axis of the first section of each axle.

6. The assembly of claim 1 wherein: the first sleeve means comprise a pair of sleeves secured to opposite sides of the arm and extended in lateral opposite directions along a common axis, said second section of each axle being mounted on one of the sleeves, and means to hold each axle in assembled relation with the sleeve associated with each axle.

7. The assembly of claim 1 wherein: the second sleeve means comprise a pair of sleeves secured to opposite sides of the arm and extended laterally and upwardly therefrom to position the first sections of the axles along a common lateral axis to locate the wheels in spaced side-by-side positions, said second section of each axle being mounted on one of the sleeves, and means to hold each axle in assembled relation with the sleeve associated with each axle.

8. The assembly of claim 1 wherein: the first sleeve means comprises a pair of first sleeves secured to opposite sides of the arm and extended in lateral opposite directions along a common axis, said second section of each axle being mounted on one of the first sleeves, means to hold each axle in assembled relation with the first sleeve associated with each axle, said second sleeve means comprising a pair of second sleeves secured to opposite sides of the arm adjacent the first sleeves, said second sleeves extended laterally and upwardly from the axle to position the first sections of the axles along a common lateral axis to locate wheels in spaced side-by-side positions, said second section of each axle being selectively mounted on one of the second sleeves, and means to hold each axle in assembled relation with a second sleeve associated with each axle.

9. The assembly of claim 8 wherein: the second section of each axle extends at an angle of between 15-30 degrees relative to the longitudinal axis of the first section of each axle.

10. The assembly of claim 8 wherein: the first pair of sleeves and second pair of sleeves each have passages for accommodating the second sections of the axles.

11. A wheel assembly for an implement having a tool bar comprising: an arm adapted to be mounted on the tool bar, a pair of wheel and axle means for supporting the arm and tool bar, each wheel and axle means having a ground engaging wheel and an axle rotatably supporting a wheel, each axle having a first section and a second section, said second section extended at an obtuse angle relative to the longitudinal axis of the first section, means rotatably mounting a wheel of the first section of each axle, first means mounted on the arm for selectively connecting the axles to the arm, said second section of each axle being mounted on the first means in a position to hold the wheels in a toe-out and camber position, and second means mounted on the arm for selectively connecting the axles to the arm, said second section of each axle being mounted on the second means in a position to hold the wheels in upright spaced side-by-side positions.

12. The assembly of claim 11 wherein: the first means comprises a pair of sleeves secured to opposite sides of the arm and extended in lateral opposite directions along a common axis, said second section of each axle being mounted on one of the sleeves, and means to hold each axle in assembled relation with the sleeve associated with each axle.

13. The assembly of claim 11 wherein: the second means comprises a pair of sleeves secured to opposite sides of the arm and extended laterally and upwardly therefrom to position the first sections of the axles along a common lateral axis to locate the wheels in spaced side-by-side positions, said second section of each axle being mounted on one of the sleeves, and means to hold each axle in assembled relation with the sleeve associated with each axle.

14. The assembly of claim 11 wherein: the first means comprises a pair of first sleeves secured to opposite sides of the arm and extended in lateral opposite directions along a common axis, said second section of each axle being mounted on one of the first sleeves, means to hold each axle in assembled relation with the first sleeve associated with each axle, said second means comprising a pair of second sleeves secured to opposite sides of the arm adjacent the first sleeves, said second sleeves extended laterally and upwardly from the axle position of first sections of the axles along a common lateral axis to locate the wheels in spaced side-by-side positions, said second section of each axle being selectively mounted on one of the second sleeves, and means to hold each axle in assembled relation with a second sleeve associated with each axle.

15. The assembly of claim 14 wherein: the first pair of sleeves and second pair of sleeves each have passages for accommodating the second sections of the axles.

16. The assembly of claim 15 wherein: the second section of each axle extends at an angle of between 15-30 degrees relative to the longitudinal axis of the first section of each axle.

17. A wheel assembly for an implement having a transverse tool bar comprising: an arm having an upper end section and a lower end section, means connected to the upper end section of the arm adapted to be connected to the tool bar, means connected to the arm to hold the arm in a selected position relative to the tool bar, a pair of ground engaging wheel and axle means for supporting the arm and tool bar above the ground, each wheel and axle means having a ground engaging wheel and an axle rotatably supporting a wheel, each axle having a first section and a second section, said second section extended at an obtuse angle relative to the longitudinal axis of the first section, and means rotatably mounting a wheel of the first section of each axle, a pair of first sleeves having passages mounted on the lower end section of the arm for selectively connecting the axles to the arm, said second section of each axle being located in a passage of a first sleeve and located in a position to hold the wheels in a toe-out and camber position, means to fix the position of the second section of each axle on the sleeve associated with said second section of each axle to maintain the wheels in said toe-out and camber position, and second sleeves having passages mounted on the lower end section of the arm adjacent the first sleeves, said second sleeves being secured to opposite sides of the arm and extended laterally and upwardly therefrom to position the first sections of the axles along a common lateral axis to locate the wheels in spaced side-by-side positions, said second sections of each axle being selectively mounted on one of the second sleeves, and means to hold each second section of the axle in fixed relation relative to the second sleeves associated with each axle, thereby holding the wheels in said spaced side-by-side positions.

18. The assembly of claim 17 wherein: the second section of each axle extends at an angle of between 15-30 degrees relative to the longitudinal axis of the first section of each axle.

19. The assembly of claim 17 wherein: the means connected to the arm to hold the arm in a selected position relative to the tool bar includes a selectively linear extendible and contractible assembly operable to vary the selected position of the arm whereby the elevation of the tool bar can be controlled.

* * * * *